United States Patent [19]

Cope et al.

[11] Patent Number: 4,951,056
[45] Date of Patent: Aug. 21, 1990

[54] COLLISION DETECTION SYSTEM

[75] Inventors: Randall D. Cope, Ridgecrest; Mark P. Egan, Inyokern, both of Calif.

[73] Assignee: The United States of America as represented by the Secretary of the Navy, Washington, D.C.

[21] Appl. No.: 374,127

[22] Filed: Jun. 26, 1989

[51] Int. Cl.⁵ .............................................. G01S 03/02
[52] U.S. Cl. .................................... 342/29; 342/33
[58] Field of Search ........................ 342/29, 33, 41, 65

[56] References Cited

U.S. PATENT DOCUMENTS

| | | | |
|---|---|---|---|
| 3,001,191 | 9/1961 | Richter | 343/10 |
| 3,052,882 | 9/1962 | Pidhayny et al. | 342/ |
| 3,187,328 | 6/1965 | Vetter | 342/ |
| 3,369,231 | 2/1968 | Foral | 342/ |
| 3,714,651 | 1/1973 | Lyon | 342/ |
| 4,236,157 | 11/1980 | Goss et al. | 343/7 |
| 4,713,669 | 12/1987 | Sluch | 342/ |

*Primary Examiner*—Thomas H. Tarcza
*Assistant Examiner*—Mark Hellner
*Attorney, Agent, or Firm*—Sol Sheinbein; Melvin J. Sliwka; Stephen J. Church

[57] ABSTRACT

The detection, by doppler frequencies in reflected wave energey, of an object, such as an obstruction on a landing surface approached along a path at a shallow angle to the surface, using doppler frequencies returned from a fixed range. The frequencies returned by the surface and the obstruction are distinguished by their relation to a threshold frequency determined by the velocity along the path and the angle. Returns from the surface as the angle of incidence at the fixed range increases from the initial normal angle of incidence are minimized by selection of the carrier frequency, and clutter is rejected by ignoring a return at the fixed range that does not correspond to a subsequent return at a nearer range.

13 Claims, 4 Drawing Sheets

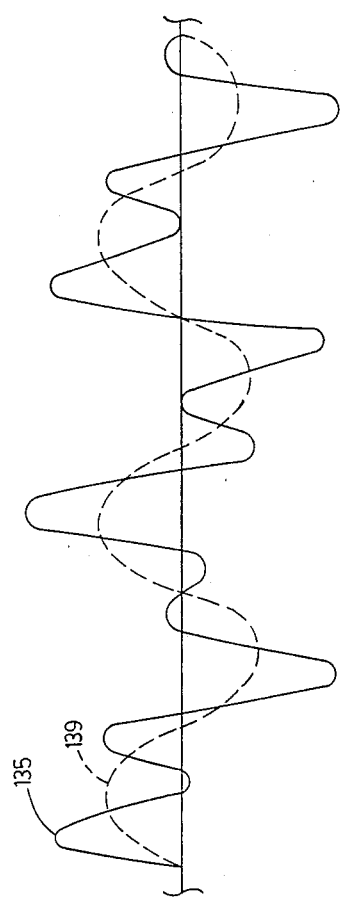
FIG. 5A
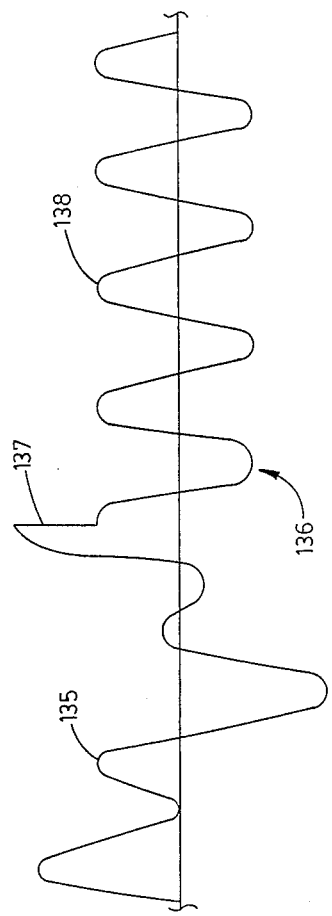
FIG. 5B
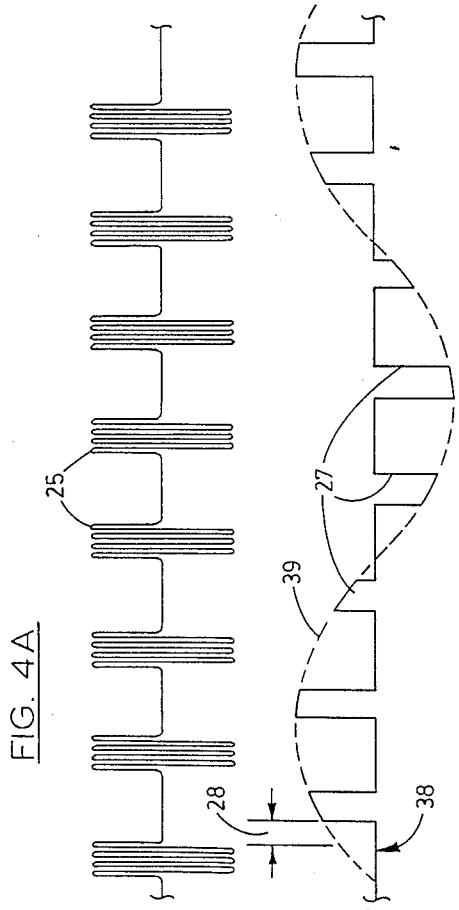
FIG. 4A
FIG. 4B

COLLISION DETECTION SYSTEM

BACKGROUND OF THE INVENTION

1. Field of the Invention

The present invention relates to radio wave communications, more particularly to reflected wave systems providing position indication for collision avoidance and with altitude determination for presence detection and landing systems.

2. Description of the Prior Art

Systems utilizing reflected wave energy to detect approach to an obstruction or other object are well-known. However, prior art systems for this purpose typically give indeterminate results when the energy is returned from both an object and a surface on which the object is disposed. Although different doppler frequencies are returned by the object and surface, the use of techniques such as highly directive antennas, a plurality of carrier frequencies, and complex signal processing such as a Fourier transform are often not practically usable to distinguish the frequencies because of time and cost constraints. This is particularly true in light aircraft landing systems where the accurate determination of distance to a landing surface or an obstruction thereon, together with the rejection of clutter, is highly desirable, but has hitherto involved expensive and complex apparatus and methods.

SUMMARY OF THE INVENTION

It is, therefore, an object of the present invention to provide in a vehicle having a relatively shallow angle approach to a surface on which may be disposed an obstruction or other object of interest, a system for effective detection of the surface and the obstruction.

Another object is to provide such detection clearly distinguishing approach to the surface from approach to an obstruction thereon.

A further object is to provide such detection which may be carried out in a relatively short time by apparatus of minimal bulk and expense.

These and other objects and advantages are provided by a system adapted to detect doppler frequencies in wave energy, such as electromagnetic radiation, which is returned from a predetermined range. The system distinguishes doppler frequencies, which are returned from such a surface and are lower than a predetermined threshold frequency because the initially detected component of approach velocity at the range is generally normal to the surface, from doppler frequencies which are returned from an obstruction in the path and correspond to the approach velocity and are thus higher than the threshold frequency. The threshold frequency is selected to correspond to a component of the approach velocity between such initial component and the approach velocity. Doppler frequencies returned from the surface may be suppressed by high pass filtration at the threshold frequency and by the use of a carrier frequency which is returned weakly at angles of incidence corresponding to such a shallow angle of approach. Clutter returns apparently at the predetermined range and at frequencies above the threshold frequency may be rejected if not also appearing at a nearer range.

BRIEF DESCRIPTION OF THE DRAWINGS

The features of the subject invention will become apparent from the following detailed description of the invention when considered with the accompanying drawing figures, wherein:

FIG. 4A is a diagram of representative emitted pulses of wave energy utilized by the invention;

FIG. 4B is a diagram of representative returned such pulses with imposed doppler frequencies and after detection;

FIG. 5A is a diagram of a returned, reconstructed wave form prior to processing in accordance with the invention; an FIG. 5B is a diagram of the wave form of FIG. 5 following such processing.

DETAILED DESCRIPTION OF THE INVENTION

Figure 1:
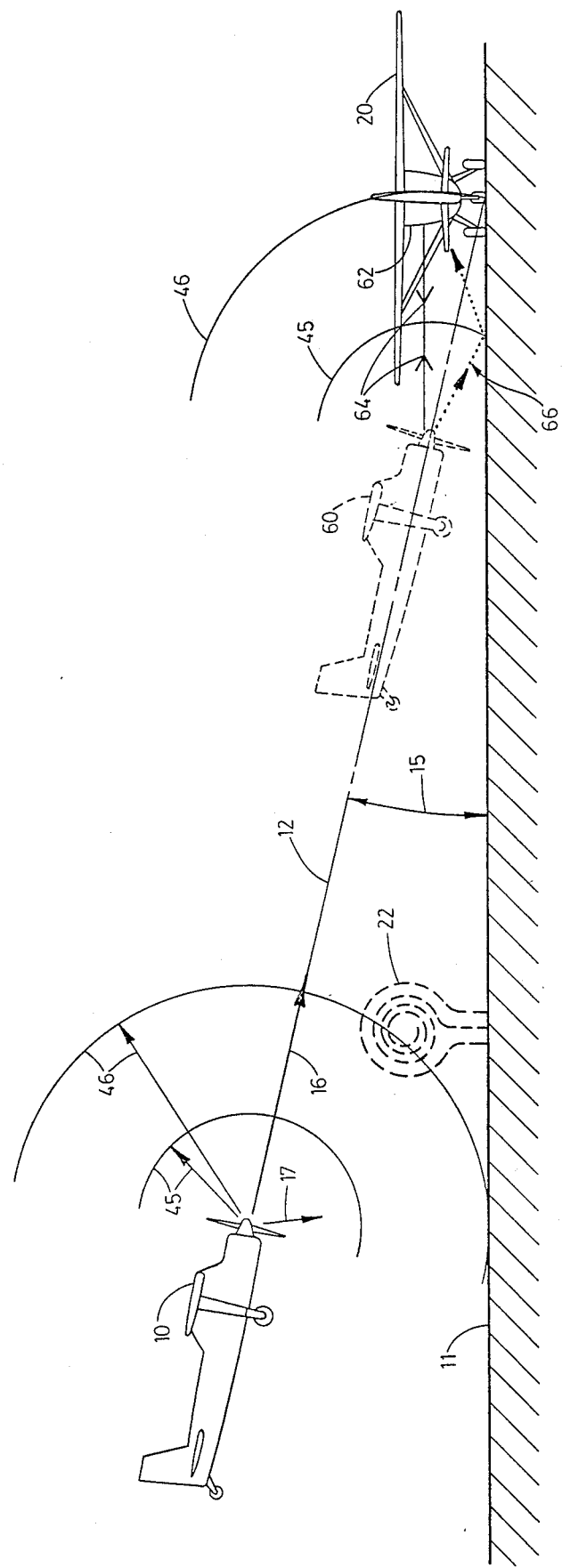
FIG. 1 is an diagrammatic elevation showing a representative operating environment for the invention.

The subject invention is best understood in relation to a representative operating environment shown in FIG. 1 and including a vehicle 10, which is depicted as a light aircraft, approaching a surface 11, which is depicted as a planar, earth landing surface or runway for the aircraft, along a generally linear path 12, which is represented by a long and short dash line and is at a relatively shallow angle to the surface as indicated by arrow 15. Vehicle 10 approaches surface 11 with a velocity along path 12 represented by a vector 16 having a component 17 normal to surface 11. The angle and speed of vehicle 10 relative to surface 11 and represented by vector 16 are, typically, predetermined by the aerodynamic characteristics of an aircraft vehicle and may be assumed or provided by any suitable instrumentation.

Path 12 is directed toward an obstruction 20 disposed on surface 11 and represented as another light aircraft as might taxi onto a runway into the path of landing aircraft 10 with resulting risk of collision between the aircraft. The present invention includes a system for detecting such a risk and, typically, installed in an vehicle, such as landing aircraft 10. The invention also includes the rejection of clutter, which for the present purposes is defined as any object or apparent object other than surface 11 or obstruction 20, such as a clutter object 22 depicted in dash lines in FIG. 1.

Figure 2:
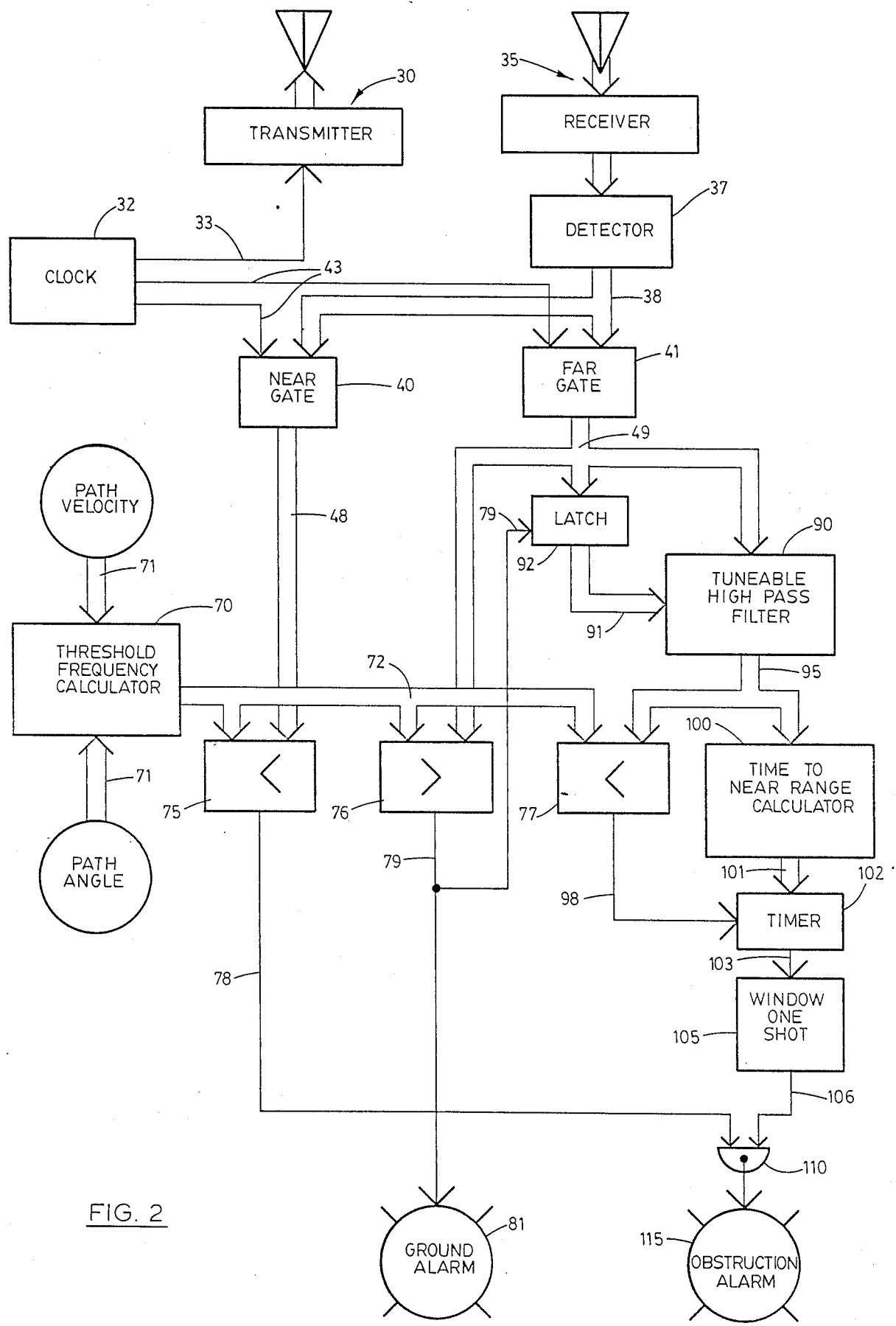
FIG. 2 is a block diagram of apparatus for practicing the invention.
Figure 3:
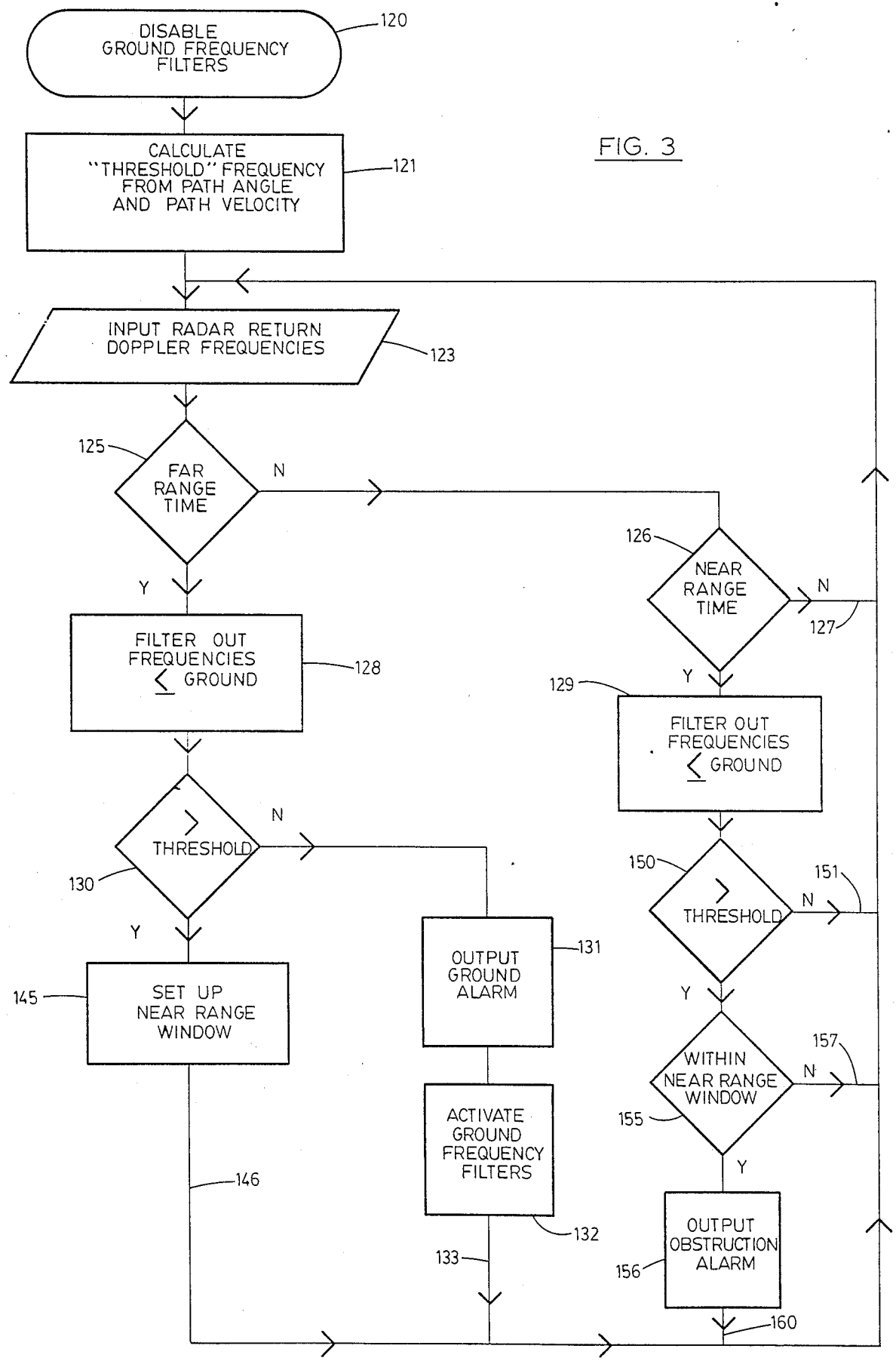
FIG. 3 is a flow chart representing a method of practicing the invention.

A preferred embodiment of such a system embodying the present invention is represented in FIG. 2 and functions in accordance with a method of practicing the invention represented in FIG. 3. This embodiment involves at least one distance determined by a round trip travel time, as between vehicle 10 and an object such as surface 11 or obstruction 20, of any suitable pulses, which are represented in FIG. 4A as pulses 25 emitted by a system embodying the invention and are returned to the system as pulses 27 represented in FIG. 4B to the same time frame as in FIG. 4A where the round trip travel time is represented by an arrow 28. This embodiment also involves relative velocities between such a vehicle and such an object, each such velocity being determined by a corresponding doppler frequency imposed on the returned pulses 27 as represented in FIG. 4B. When the present invention is utilized for aircraft landing safety as shown in FIG. 1, the invention, preferably and for reasons subsequently set forth, is embodied in a radar system employing as a carrier for the pulses electromagnetic radiation in the VHF and UHF wavelengths of 30 Mhz to 3 Ghz. The principles of the present invention may, however, be employed for other purposes and may then be used with other wavelengths, kinds of wave energy, or techniques for distance determination.

FIG. 2, wherein signals representing digital numbers and analog values are shown as double line arrows and binary signals are shown as single line arrows, depicts a radar system having any suitable transmitting portion 30 for emitting pulses 25 in a generally hemispherical pattern forwardly of aircraft 10 and transversely of path 12. The system includes a clock 32 providing a signal 33 to control portion 30 in a well-known manner so that successive pulses 25 are emitted at predetermined intervals. The system also includes a receiving portion 35 for receiving pulses 27 as returned from surface 11 and obstruction 20. Portions 30 and 35 are depicted as having separate antennas but a duplexed antenna may be used, and it will be subsequently apparent that the present invention does not require an antenna which is large or elaborate so as to be highly directional or provide substantial side lobe suppression. Receiving portion 35 provides signals representing the returned pulses to any suitable detector 37 which generates a signal 38, FIGS. 2 and 4B, with returned pulses 27 having imposed thereon amplitude modulated doppler signals due to relative velocities such as 16 and 17, a representative such doppler signal being indicated in FIG. 4B by dash sine wave 39.

The radar system of FIG. 2 has a near gate 40 and a far gate 41 which receive signal 38 and also receive individual signals 43 from clock 30. Signals 43 correspond individually to return times, such as 28, of two fixed and predetermined ranges from aircraft 10, a near range represented in FIG. 1 an by arrow and arcs indicated by numeral 45 and a far range similarly indicated by numeral 46. Gate 40 functions in a well-known manner to pass signal 36 as a signal 48 only at return times corresponding to regions of surface 11 and obstruction 20 at range 45 from aircraft 10. Gate 49 functions similarly to provide a signal 49 corresponding to such regions at range 46. Gates 40 and 41 thus serve to identify wave energy from objects at the corresponding ranges, and it will be apparent from FIG. 4B that returned doppler frequencies can be determined in any suitable manner, of which a number are well-known, from successive returned pulses 27. Since a radar collision detection system of the present invention is used at relatively short distances from a landing surface, such as 11, and a possible obstruction, such as 20, the system will not have ambiguous radar ranges even at a relatively high repetition rate for emitted pulses 25.

In FIG. 2, aircraft 10 is depicted at far range 46 from surface 11 and, incidentally, from clutter object 22. Far range 46 is depicted as twice near range 45, a typical ratio for the practice of the present invention. However, for illustrative convenience the aircraft is depicted at a scale relatively large in relation to typical ranges 45 and 46. As the aircraft continues along path 12 it will reach a subsequent position 60, where the aircraft is represented in dash lines at the far range from obstruction 20.

It is apparent that, due to shallow path angle 15, an obstruction 20 such as an aircraft will have a portion 62 which extends transversely of path 12. As a result and as indicated by arrows 64, wave energy emitted toward this portion from the aircraft 10 is normally incident on the portion and, whatever its frequency, is strongly reflected from obstruction 20 in a direction substantially back along the path. However, such energy emitted as indicated by dot line 66 toward surface 11 when the aircraft is at near range 45 therefrom has a relatively high angle of incidence measured from the normal to the surface. It might appear that the angle of reflection would equal such an angle of incidence as shown by line 66; however it is well-known that, over the range of electromagnetic frequencies commonly used for radar, this relation does not hold for frequencies above UHF and that the reflectivity back in the direction of incidence increases with frequency for shallow angles of incidence corresponding to that of path 12 and similarly measured from surface 11.

The system of FIG. 2 has any suitable threshold frequency calculator 70 for receiving signals 71 corresponding to the path angle and velocity and calculating, prior to aircraft 10 reaching far range 46 from surface 11 and from these signals and the carrier frequency of emitted pulses 25, a threshold doppler frequency corresponding to a velocity which is less than the approach velocity 16, but which is greater than a doppler frequency corresponding to component 17 thereof normal to surface 11. The threshold frequency is provided from calculator 70 as a signal 72 to three comparators 75, 76, and 77. Comparator 75 also receives the near gate signal 48 corresponding to a doppler frequency being returned from an object at near range 45. Comparator 75 is adapted to output a signal 78 indicating that such near range doppler frequency is greater than the threshold frequency. Comparator 76 receives the far gate signal 49 corresponding to a doppler frequency being returned from an object at far range 46 and is adapted to provide a signal 79 indicating that such far range doppler frequency is less than the threshold frequency, as occurs when a doppler frequency corresponding to velocity 17 is received due to aircraft 10 being initially at far range 46 from landing surface 11 in a direction normal thereto. The system includes a ground alarm 81 which receives signal 79 and is initiated thereby to provide any suitable warning signal, typically audible and visible, that the landing surface is at the far range below the aircraft.

Comparator 77 also receives far gate signal 49 for comparison with threshold frequency signal 72, but only after high pass filtration of signal 49 by a tuneable filter 90. Filter 90 is tuned by a signal 91 provided by a latch 92 which receives and retains signal 49 when signal 79 indicates that the far range doppler frequency is less than the threshold frequency. Filter 90 thus, in effect, passes any doppler frequency greater than a frequency corresponding to velocity 17 when surface 11 is initially at far range 46, this passed doppler frequency being represented by a signal 95 from filter 90. It is apparent that, in the absence of clutter, signal 95 corresponds to velocity 16 along path 12 as determined by a doppler frequency imposed by reflection from obstruction 20. Signal 95 is provided to comparator 77 together with threshold signal 72, and this comparator is adapted to provide a signal 98 indicating that the far range doppler frequency is greater than the threshold frequency.

The system of FIG. 2 has a time to near range calculator 100 which receives filtered doppler frequency signal 95. This signal should correspond to path velocity 16 as before stated, and calculator 100 is adapted in any suitable manner to calculate from signal 95 a time period, referred to in the claims as "a clutter delay time" for aircraft 10 to travel substantially the distance between near range 45 and far range 46 at velocity 16.

This time period is, of course, the time between a return of wave energy from an actual obstruction, such as taxiing aircraft 20, at the far range and such a return at the near range. Calculator 100 provides a signal 101 representing this period and provided to a timer 102 which is initiated by signal 98 and, in turn, generates a signal 103 indicating the end of the delay time. Signal 103 initiates a window one shot 105 which provides a window pulse signal 106 having a duration sufficient to allow for any inaccuracies in determinating the clutter time.

Window signal 106 and signal 78, which indicates the presence of an object at the near range 45 returning a doppler frequency greater than the threshold frequency, are provided to an and gate 112 which initiates an obstruction alarm 115 for generating any suitable warning signal when signals 78 and 108 occur together. The system of FIG. 2 thus generates an obstruction warning signal on detection of such a doppler frequency in wave energy returned from the predetermined far range as indicated by signal 106 which is derived ultimately from the initiation of timer 102 by signal 98 upon such detection. The obstruction warning signal thus signifies that obstruction 20 is present on landing surface 11 and is at predetermined near range 45 in a direction along path 16 from a landing aircraft, such as aircraft 10.

More specifically, alarm 115 only indicates the presence of an object, such as obstruction 20, at near range 45 if the object has been previously detected by doppler signals, which correspond to velocity 16 along path 12 at the near range and which have a doppler frequency greater than the threshold frequency calculated by calculator 70, and is again detected during a clutter delay time window following detection of the object at the far range 46 by such doppler signals. As a result, similar doppler frequencies which are due to clutter and would be improperly detected by far gate 41 and comparator 77 are inhibited from initiating alarm 115 by the action of calculator 100, timer 102, one shot 105, and gate 110. That is, this alarm is inhibited if comparator 75 does not, in effect, detect doppler frequencies higher than the threshold frequency within the clutter delay time following the detection of such higher frequencies by gate 77.

It will be apparent that, if such rejection of clutter is not necessary, signal 98 from comparator 77 may be provided directly to an alarm, such as obstruction alarm 115, to indicate that obstruction 20 is at far range 46 from aircraft 10 as soon as the aircraft arrives at position 60.

MODE OF OPERATION OF THE INVENTION

The flowchart of FIG. 3 corresponds to the operation of the system of FIG. 2 and will be briefly discussed except for certain processing, in accordance with the present invention, of wave energy returned from ground surface 11, obstruction 20, and clutter 22. The method of the present invention shown by the flowchart may be performed digitally and, if expedient, by a single microcomputer as well as by a system corresponding to FIG. 2. It is believed that the arrangement and programming of digital devices to carry out the method are readily apparent to one skilled in the radar art.

Initially, as indicated by a block 120 of FIG. 3, a ground frequency, which is subsequently set to correspond to tuning signal 91 for filter 90, is set to a value allowing the detection of a doppler frequency corresponding to velocity 17. The threshold frequency corresponding to signal 72 is then calculated at a block 121 as described above in connection with calculator 70, and a processing loop, which commences with the input of returned doppler frequencies at a block 123, is then entered. These frequencies are then filtered, as indicated by a block 125 which corresponds to filter 90. The delay time 28 represented in FIGS. 4A and 4B is then tested as shown in decision blocks 127 and 128 which correspond, respectively, to far gate 41 and near gate 40. If the return is not from either the far range 46 or the near range 45, the return is ignored and, as indicated by a path 129, another input is performed.

If the return is from the far range 46, the doppler frequency of the return is compared, as indicated by a block 130 which performs the functions of comparators 76 and 77, with the previously calculated threshold frequency. If the return doppler is less than the threshold, it is assumed that the return is from ground surface 11. Therefore, a ground alarm, such as alarm 81, is initiated as indicated by a block 131; the ground return frequency stored, an action corresponding to that of latch 92 and indicated by a block 132; and further returns input as indicated by a path 133.

A subsequent return at block 123 of FIG. 2 typically has a waveform indicated in FIG. 5A by numeral 135. FIG. 5B shows a waveform 136 which initially is the same as waveform 135, but which has a point of inflection 137 at which filtering in accordance with the present invention is initiated to provide a filtered waveform 138. Waveform 135 is the sum of a lower doppler frequency, which is depicted by a dash line sine wave 139 and corresponds to velocity component 17, FIG. 1, and a higher doppler frequency which corresponds to velocity component 16 and is a filtered waveform 138 of FIG. 5B. Doppler frequencies 138 and 139 may have similar amplitudes since, as seen in FIG. 1 for an aircraft at position 60, surface 11 is nearer than obstruction 20 while the obstruction may be more reflective. As is apparent from waveform 135, frequency 139 may interfere with detection of frequency 138 although frequency 138 as before stated, above a threshold frequency between frequencies 138 and 139. Therefore, after input of a radar return at block 125, FIG. 3, the return is filtered to remove frequencies substantially at and below the ground frequency as stored at block 132 so that the signal to noise ratio of the input waveform is not reduced by frequencies at and below a doppler frequency corresponding to velocity 17.

Returning to FIG. 3, if a return is from the far range as decided by block 127 and has a doppler frequency above the threshold frequency as decided by block 130, a near range window time is started as indicated by a block 145, and further returns input as indicated by a path 146. This near range window is determined as previously described in connection with calculator 100, timer 102, and one shot 105. At this point an obstruction, such as obstruction 20, has apparently been found at far range 46 when a landing aircraft is at a position corresponding to position 60, FIG. 1, and any subsequent return apparently at near range 45 is directed by decision blocks 127 and 128 to a decision block 150, FIG. 3, where the doppler frequency of the return is compared with the threshold frequency, an action corresponding to the function of comparator 75, FIG. 2. If such subsequent return is not above the threshold frequency, the return is ignored as clutter related to surface 11 and further returns are then input as indicated by a path 151.

At this point there will be described the determination of the threshold frequency, which is discussed at several points above and which is relied on in accordance with the principles of the present invention as a simple and effective method for distinguishing wave energy returned from surface 11 and having a doppler frequency corresponding to velocity 17 from wave energy returned from an obstruction 20 and having a doppler frequency corresponding to velocity 16. For this purpose, the threshold frequency must be between these doppler frequencies; however, obstruction 20 ideally returns a doppler frequency corresponding to path velocity 16 so that the threshold frequency, preferably, corresponds approximately to the path velocity, but is somewhat less than the doppler frequency corresponding to the path velocity by any suitable margin of error. Such a margin of error can be readily determined by one skilled in the radar art, and will obviously vary with the accuracy with which the parameters of path angle 15 and path velocity 17 are measured or assumed, with possible deviations between an axis of an antenna of receiving portion 35 and path 12, and with the accuracy of extraction by analog or digital apparatus of doppler frequencies from the returned wave energy.

The present invention distinguishes surface 11 from an obstruction 20 thereon by the doppler frequencies returned by the surface and the obstruction being, respectively, less than and greater than a predetermined threshold frequency. However and as described previously in connection with FIG. 1, although surface 11 is, at any predetermined range from aircraft 10, being approached at velocity 17 when the aircraft is initially at such range from the surface so that the surface then returns a doppler frequency corresponding to velocity 17 and below any selected threshold frequency, the velocity of approach to the surface as a component of velocity 16 subsequently increases toward velocity 16 so that, at such range, surface 11 is being approached at a velocity higher than that corresponding to the threshold frequency and any return doppler frequency from the surface at such range is then greater than the threshold frequency and may result in improper detection of surface 11 as an obstruction, such as obstruction 20, thereon. Such improper detection is, therefore, avoided when the present invention is used with electromagnetic wave energy in the radar frequency range by employing a VHF or UHF frequency which, as before stated, is weakly backscattered at angles of incidence corresponding to shallow angle 15 of path 12. Such energy thus has too low an amplitude when returned to a system, such as that of FIG. 2 and mounted in vehicle 10, to be confused with strongly reflected such energy returned from an object such as a taxiing aircraft 20 obstruction.

It is apparent from the preceding two paragraphs that a return, which is input at block 123 of FIG. 3; which is determined at block 128 to correspond to the near range 45; and which is above the threshold frequency as determined at block 150, corresponds to an object detected at the far range 46 and is thus an obstruction 20 if the return occurs during the near range window time period described above in connection with block 145. If such return is within such window as determined by a decision block 155, an obstruction alarm corresponding to alarm 115 of FIG. 2 is initiated as indicated by block 156 of FIG. 3. If the return is not within such window as determined at block 155, the input is assumed to be clutter and, as indicated by a path 157, another return is input at block 123 in case the return may be within the window.

After an obstruction alarm is initiated at block 156, a system carrying out the method of the present invention has detected and warned of a potential collision and may cease operation; however, operation may continue, as indicated by a path 160 leading from block 156, to input further returns and give repeated alarms for a detected obstruction or to detect another obstruction.

Obviously, many modifications and variations of the present invention are possible in light of the above teachings. It is, therefore, to be understood that within the scope of the following claims the invention may be practiced otherwise than as specifically described.

What is claimed is:

1. A method for sensing the arrival of a vehicle at a surface approached by the vehicle at a predetermined velocity along a path at a predetermined shallow angle to the surface; the vehicle having a system adapted to emit wave energy at a predetermined frequency generally toward the surface, adapted to receive reflected such energy returned from the surface when the vehicle is at a predetermined distance therefrom, and adapted to detect in such reflected energy doppler frequencies due to relative velocities between the vehicle and the surface, the method comprising:

prior to the vehicle reaching said predetermined distance from the surface, calculating from said predetermined velocity, said predetermined angle, and said predetermined frequency a threshold doppler frequency which is below a higher doppler frequency corresponding to said predetermined velocity and which is above a lower doppler frequency corresponding to a component of said predetermined velocity generally normal to the surface;

determining that the vehicle has arrived at said predetermined distance from the surface in a direction along the path by detecting, in such reflected energy, a doppler frequency above said threshold frequency.

2. The method of claim 1 wherein, as the vehicle approaches the surface, reflected such energy therefrom having such a lower doppler frequency is received by the system and may interfere with such detecting of a doppler frequency above said threshold frequency, and wherein the method further comprises, when such a lower doppler frequency is received, filtering from subsequently received such reflected energy doppler frequencies substantially at and less than the received such lower doppler frequency.

3. The method of claim 2 wherein:

the path is toward an object disposed at the surface and having a portion extended transversely thereof so that the object reflects such energy relatively strongly back along the path from said portion and so that such energy reflected back along the path has an object doppler frequency which is such a higher doppler frequency;

as the vehicle further approaches the surface, a component of said predetermined velocity in a direction between the vehicle and the surface increases from a velocity corresponding to said lower doppler frequency toward a velocity corresponding to said higher doppler frequency so that, as such component increases, the doppler frequency corresponding thereto increases above such filtered doppler frequencies and may be improperly detected as said object doppler frequency; and for such wave energy at angles of incidence corresponding to said predetermined angle, the surface has a reflectivity which, in a range of frequencies of such wave energy, increases with the frequency of such wave energy, and wherein said predetermined frequency is selected in a lower frequency portion of said range so that such energy reflected from the surface toward the vehicle is relatively weak in relation to such energy reflected back along the path from said portion and so that such a higher doppler frequency of such energy reflected from the surface is not detected as said object doppler frequency.

4. The method of claim 1 wherein:
a first predetermined action is required when the vehicle is at said predetermined distance from the surface in a direction generally normal thereto;
the surface has an object toward which the path is directed; and
a second predetermined action is required when the vehicle is at said predetermined distance from the object in a direction generally along said path, and
wherein the method further comprises:
  initiating said first predetermined action when said lower doppler frequency is detected in said reflected energy;
  initiating said second predetermined action when said higher doppler frequency is detected in said reflected energy.

5. The method of claim 4 wherein said vehicle is an aircraft, said surface is a landing surface therefor, and said object is an obstruction on said surface and wherein said first action is providing a first warning signifying that the landing surface is at said distance below the aircraft, and said second action is providing a second warning signifying that the obstruction is present on said surface.

6. A collision detection system for use with a vehicle approaching a surface, which has a possible obstruction thereon, at a predetermined approach velocity along a path at a predetermined shallow approach angle to the surface, the system comprising:
  means for emitting wave energy having a predetermined frequency in directions forwardly of the vehicle and transversely of the path;
  means for receiving returned energy reflected back in said directions from the surface and such an obstruction;
  means for identifying said returned energy reflected from a region of the surface and from such an obstruction when
  said region and obstruction are at a predetermined range from the vehicle;
  means for detecting in the returned energy doppler frequencies corresponding to approach velocity components in said directions;
  means for calculating from said approach angle and approach velocity a threshold doppler frequency corresponding to a velocity less than said approach velocity and greater than such a component normal to the surface; and
  means for generating an obstruction warning signal when a doppler frequency greater than said threshold frequency is detected in such returned energy received from said predetermined range.

7. The system of claim 6 further comprising:
  such detecting means for identifying in such energy returned from said range a surface doppler frequency lower than said threshold frequency and corresponding to such an approach velocity component normal to said surface; and
  means for generating a surface warning signal when such a surface doppler frequency is identified.

8. The system of claim 6 further comprising:
  first such detecting means for identifying in such energy returned from said range a first received doppler frequency lower than said threshold frequency and corresponding to such an approach velocity component normal to said surface;
  second such detecting means for identifying in such energy returned from said range at said doppler frequency greater than said threshold frequency; and
  means for selectively providing only doppler frequencies in said returned energy from said range above said first received doppler frequency to said second detecting means, so that the signal to noise ratio therein is not reduced by frequencies at and below said first received doppler frequency.

9. The system of claim 6 wherein:
  such an obstruction has a portion extending generally transversely of the surface so that such wave energy emitted along the path at any frequency in a suitable range thereof is incident substantially normally on said portion and is strongly returned back along the path;
  due to said shallow approach angle, such returned energy from such region of the surface at said range initially has a relatively low doppler frequency corresponding to such a component of the approach velocity normal to the surface and less than said threshold frequency and subsequently has a relatively high doppler frequency corresponding generally to said approach velocity and greater than said threshold frequency;
  lower frequencies in said range are reflected relatively weakly from the surface in a directions generally back along the path and higher frequencies in said range are reflected relatively strongly from the surface in a directions generally back along the path, and
wherein said emitting means emits such wave energy at a predetermined frequency selected from said lower frequencies so that said returned energy from said surface at said range is relatively weak and not identified as such returned energy from such an obstruction.

10. The system of claim 9 wherein said surface is the earth surface; said wave energy is electromagnetic energy; and said predetermined frequency is in the range of 30 megahertz to 3 gigahertz.

11. The system of claim 6:
  wherein said wave energy is emitted in successive pulses thereof;
  wherein said means for identifying said energy returned from said predetermined range identifies said energy as such wave energy received during a time period after each of said pulses corresponding to the round trip time of said energy at said range; and wherein said returned doppler frequencies are determined from successive returned pulses of said energy.

12. The system of claim 6 wherein said calculating means generates such a threshold doppler frequency corresponding substantially to said approach velocity less a predetermined margin of error.

13. The system of claim 6 wherein:
said range is a predetermined far range and said identifying means is a far range identifying means; and
such energy returned from clutter may improperly be identified by said far range identifying means as such energy returned from such an obstruction, and wherein the system further comprises:
near range identifying means for detecting said returned energy returned at a frequency greater than said threshold frequency from such an obstruction at a predetermined near range;
means for calculating from a velocity corresponding to said approach velocity a clutter delay time in which such an obstruction which returns such energy at said far range will return such energy at said near range; and means for inhibiting the generating of said warning signal if said near range identifying means does not detect such returned energy corresponding to such an obstruction substantially at said clutter delay time following the detection at said far range of said doppler frequency greater than said threshold frequency.

* * * * *